3,335,796
TREATMENT OF WELLS WITH RESIN-IM-PREGNATED, RESIN-COATED WALNUT SHELL PARTICLES

Phillip H. Parker, Jr., San Rafael, Calif., assignor to Chevron Research Company, a corporation of Delaware
No Drawing. Filed Feb. 12, 1965, Ser. No. 432,411
4 Claims. (Cl. 166—12)

ABSTRACT OF THE DISCLOSURE

The invention is directed to treatment of oil wells which traverse subsurface formations containing loose sand or earth particles and consists of the formation of a fluid-permeable, consolidated matrix around the periphery of the well bore and adjacent the incompetent earth formation. The method involves the pre-treatment of crushed walnut shells with a thermosetting resin such as an epoxy resin which is then cured to an infusible solid state. The pre-treated walnut shells are reduced to a suitable size and then a second application of a thermosetting resin is applied as an adhesive coating to the particles. The pre-treated and coated walnut shell particles are suspended in an inert fluid vehicle and injected through the well bore into the incompetent earth formation to effect a rigid, fluid-permeable matrix structure which permits flow of earth formation fluids but screens out earth particles from the incompetent earth formation.

---

The present invention relates to a process of treating an earth formation penetrated by a well bore, whereby undesirable earth formation particles are prevented from entering the well bore, along with the desired fluid produced from the earth formation. More particularly, the invention relates to such well treatment process utilizing walnut shell particles. The invention is particularly applicable to the treatment of oil wells to control loose sand or particles that migrate from consolidated or incompetent earth formations or zones.

It is known, as shown for example, in U.S. Patent 2,823,753 to treat oil-, gas-, and water-producing earth formations around a well to prevent undesirable particles from being carried into the well with the produced fluid by a process which involves injecting into the well bore and thence into the formation a suspension of particulate matter coated with a resin to form a deformable composition about the well bore, the resin used being such that in time the composition is converted into a unitary hardened mass barrier or consolidated matrix capable of screening out formation particles but retaining permeability to flow of fluid produced by the formation.

According to the above mentioned patent, an example of particulate matter that may be used in forming the fluid-permeable barrier to earth formation particles are ground walnut shells. Ground walnut shells of suitable size, preferably of such size that not more than 10% of the particles are finer than those that pass through a No. 100 standard seive, and not more than 10% are coarser than those that pass through a No. 10 mesh, are coated with a liquid adhesive material capable of hardening and cementing the particles together, the proportion of liquid adhesive employed being such as to cause the particles to stick together and thereby form a unitary agglomerated rigid mass or matrix but insufficient to close the interstices between particles. Examples of suitable liquid adhesives given are partially condensed liquid mixtures of phenol and formaldehyde, polyesters, urea formaldehyde resins, epoxy resins, melamine resins.

The so-coated particles are then suspended in a liquid vehicle inert to the film of adhesive on the particles, examples of the vehicle being petroleum oils, either crude or refined, and vegetable oils.

The suspension is injected into the well and thence into the formation. The earth formation strains out the particles from the vehicle and are deposited therein. The resin is allowed or caused to reach the hardened, infusible and insoluble state usually by catalytic action, thereby forming a rigid fluid-permeable structure permitting flow of earth formation fluids but screening out the particles from the earth formation.

In accordance with the present invention, it has been discovered that a stronger fluid-permeable barrier of resin-coated crushed walnut shells can be obtained if the walnut shells are first subjected to a pretreatment operation. This pretreating operation involves impregnating the walnut shells with a liquid thermosetting resinous material, that is a material also capable of being hardened to the infusible and insoluble state. The resin is allowed or caused to reach the hardened or thermoset state.

Following the impregnation pretreatment the resulting walnut shells can be used in well treating operations in the manner hereinabove indicated for untreated walnut shells. That is, the pretreated walnut shells are reduced to a suitable size, coated with a suitable liquid adhesive material, and the adhesive-coated particles suspended in a suitable vehicle. The suspension is injected into the well bore and thence into the formation. The barrier produced pursuant to the invention has greater compressive strength than a similar barrier made from adhesive-coated crushed walnut shells in which the pretreatment step is omitted.

In carrying out the invention it is desirable that the liquid adhesive film surrounding the precoated walnut shell particles be caused to harden after the composition is in place in the well bore opposite the fluid producing earth formation. This can be accomplished by omitting the catalyst or curing agent from the adhesive during the mixing of it with the walnut shells and adding the catalyst or curing agent after the composition has been put in place.

The following is an example of the practice of the invention, parts being by weight:

(A) Walnut shells, 85 parts, ground to a size between 20 and 40 mesh (substantially all particles passing through a 20 standard mesh screen, and substantially all being retained on a 40 mesh screen) were intimately admixed with 15 parts of a liquid adhesive blend consisting of 49 parts of epoxy resin, 49 parts of carboxylic acid anhydride and 2 parts of amine catalyst. The amount of liquid adhesive blend was 15% by weight based on the walnut shells. The carboxylic acid anhydride was a mixture of isomers of methylbicyclo-(2.2.1) heptene-2,3-dicarboxylic anhydride (Nadic methyl anhydride). The amine catalyst was N,N-dimethylbenzylamine. The epoxy resin was an epoxy novolac resin obtained by condensing epichlorohydrin with the novolac resin of a monohydric phenol and formaldehyde, a more detailed description of the epoxy resin appearing in copending application Ser. No. 392,033, filed Aug. 25, 1964, now U.S. Patent No. 3,176,769. In the blend, the epoxy resin and carboxylic acid anhydride were present in equal weight proportions, the mixture of the two having a viscosity of 180 centipoises at 150° F. The amine catalyst was present in an amount of 2%, by weight, based on the blend.

The resin-coated shells were subjected to a temperature of about 150° F. for 15 hours to polymerize the resin, after which they were broken apart, and rescreened.

(B) The precoated walnut particles were then mixed with the same novolac epoxy resin-carboxylic acid anhydride liquid adhesive mixture used in the precoating operation, except that the amine catalyst was omitted. The amount of the mixture was 30% by weight, based on the combined weight of adhesive mixture and walnut shell particles.

After the second treatment with liquid adhesive material, the walnut shell particles, now having a second coat of adhesive, were tamped into a rigid rubber tube, one inch in diameter and 2.5 inches long, standing on end in a vessel and covered with No. 5 White Oil[1] containing the amine catalyst in proportion of 2% by volume.

The vessel and contents were then placed in an oven at a temperature of 150° F. for 15 hours to polymerize the resin. After polymerization the core was removed from the tube, washed with toluene and mixed hexanes to remove the oil, and then dried.

Permeability of the core was determined to be 16 darcies; and the compressive strength, 5700 p.s.i.

Permeability was determined by flowing water through the consolidated shells of a given cross-section and length and recording pressure and flow rate. Permeability in darcies was calculated from the Darcy equation, $$K = \frac{Q \mu L}{A \Delta P}$$

where $K$=permeability in darcies
$\Delta P$=pressure drop in atmospheres
$L$=core length in cm.
$A$=core cross-section in cm.$^2$
$\mu$=viscosity of fluid in centipoises
$Q$=flow rate in cc. per second Compressive strength was measured by placing a 1.5 inch long consolidated shell core in the Instron compression machine and compressing the sample at 0.1 inch a minute and recording the number of pounds to crush a sample of given cross-section. It was calculated in p.s.i.

(C) A similar core sample of ground walnut shells was prepared in similar fashion except that the precoating operation, i.e., step (A) above, was omitted. Accordingly, ground walnut shells of 20–40 mesh size were tamped into the rubber tube in a vessel and covered with No. 5 White Oil containing the catalyst, polymerization being effected as before. Compressive strength of the core sample was only 2300 p.s.i.

One test that may be used to determine durability of the consolidated walnut shell agglomerate is the boiling brine test (25,000 p.p.m. of sodium chloride). As is known, generally along with the oil there is also present salt water or brine in the producing formation as connate or migratory waters. It is therefore highly desirable that the fluid-permeable barrier be resistant to the action of hot brine.

According to this test, a number of samples of the core are suspended in boiling brine in a vessel provided with a reflux condenser, the core samples being suspended so as not to touch the bottom of the vessel. The samples are permitted to remain in the boiling brine for varying periods of time. For example, some samples are subjected to the boiling brine for 10 days, while other samples are subjected to the boiling brine for 30 days, and still others for 60 days. A higher value after 60 days is indicative of good brine resistance.

Cores prepared in accordance with the example above gave compressive strength values of 880 p.s.i. after ten days; 1000 p.s.i. after thirty days; and 1270 p.s.i. after sixty days. On the other hand, cores which had not been pretreated but otherwise subjected to the same treatment, as outlined in (C) above had compressive strengths of 560 p.s.i., 510 p.s.i., and 510 p.s.i. after ten, thirty, and sixty days, respectively.

While the example has been described in terms of walnut shells, other porous materials, such as peach pits, are not precluded from the broader aspects of the invention.

The amount of resinous mixture used in the precoating operations can vary from as little as about 0.5%, preferably 2%, to about 15%, preferably 6%, by weight, based on walnut shells.

The amount of resinous mixture used in the second coating operation to coat the pretreated walnut shells can vary widely depending on the particle size of the walnut shells, the ratio of precoated walnut shells to liquid resin lying between 1 and 10 pounds of walnut shells to 1 pound of liquid resin.

The liquid adhesive resinous material used in the precoating operation and in the second coating operation is not critical. It may be characterized as a thermosetting type of resin, which before it reaches the final thermoset stage undergoes reaction by treatment with a curing agent, such as a catalyst or cross-linking agent, which finally sets up the resin into the solid thermoset or insoluble infusible state.

Illustrations of such resinous materials are the partially polymerized or condensed resins such as phenol formaldehyde resins, urea formaldehyde, and melamine formaldehyde resins, which are finally cured by the reaction with a basic or acidic catalyst, such as formic acid, hydrochloric acid, oxalic acid, toluene sulfonic acid, trichloroacetic acid, quaternary ammonium compounds, primary and secondary amines, sodium hydroxide, sodium carbonate, potassium hydroxide, barium hydroxide and ammonia; ethylenically unsaturated alkyd resins, i.e., unsaturated polyesters, such as those derived from a polyhydric alcohol, an $\alpha,\beta$-ethylenically unsaturated aliphatic acid, such as a maleic, a portion of which is replaced, if desired, with a phthalic acid and/or a saturated aliphatic dibasic acid, and a monomer polymerizable therewith containing the group $CH_2=C<$, in an amount, for example, of of 40 to 80 percent based on it and unsaturated polyester, the whole curable to the final solid state by treatment with a catalyst, such as a peroxy catalyst; epoxy resins, obtained by condensing epichlorohydrin with a polyhydroxy compound, the condensation product being finally cured to the solid, insoluble, infusible state by means of a curing cross-linking agent, such as an amine, a dicarboxylic acid anhydride or other resins, such as urea formaldehyde, and melamine formaldehyde.

For a more detailed description of suitable resinous materials reference may be made to copending application Ser. No. 218,573, filed Aug. 22, 1962, now U.S. Patent No. 3,176,767.

Another example of a satisfactory resinous material is a furantype resin, derived, for example, from furfuryl alcohol, and curable with a strong acid, such as sulfuric acid and hydrochloric acid.

A preferred type of liquid resinous adhesive material is an epoxy resin curable by means of an amine. A still preferred type is a mixture of an epoxy resin and a polycarboxylic acid anhydride copolymerizable therewith, the epoxy resin component being an epoxy resin having more than two epoxy groups per molecule in primary position. Such epoxy resins can be obtained in known fashion, such as by condensing epichlorohydrin with a novolac resin of monohydric phenol. The proportions of epoxy resin and polycarboxylic acid anhydride are preferably such as to give one anhydride group for each epoxy group, i.e., 50 equivalent percent anhydride, determined by adding the total equivalents of epoxy groups and of anhydride groups, expressed in percent. However, the proportions can range from 10 to 70 percent anhydride. The interaction of epoxy resin and anhydride can be expedited by using an epoxy resin amine curing agent, such as benzyl-

---

[1] No. 5 White Oil is a paraffinic hydrocarbon having the following characteristics:
Gravity, ° API _____ 31.5–34.5
Flash Point, Cleveland Cup, ° F. _____maximum__ 360
Viscosity at 100° F., SSU _____ 106–116
Pour Point, ° F. _____maximum__ +15 dimethylamine. For a detailed description of the preferred liquid resinous adhesive material reference may be made to earlier mentioned copending application Ser. No. 392,033, filed Aug. 25, 1964, now U.S. Patent No. 3,176,769.

The resinous materials used in the two coating operations may be the same or dissimilar. Thus, in the precoating operation a phenol-formaldehyde resin can be used to impregnate the shells, while in the second coating operation an epoxy type material can be used. It will be generally convenient to use the same resinous material in both coating operations, as shown in the example.

I claim:

1. In the process of treating an earth formation penetrated by a well bore by coating walnut shell particles of suitable size with a liquid resinous adhesive material capable of hardening into the infusible and insoluble state, and of cementing the walnut shell particles together, forming a suspension of the coated particles in a vehicle, injecting the suspension into the formation to form a unitary agglomerated rigid mass of walnut shell particles capable of screening the earth formation particles from entering into the well bore while at the same time being permeable to fluid produced from the earth formation, the improvement of providing a stronger screening agglomerate of walnut shell particles which comprises impregnating walnut shells with a liquid resin capable of setting up into the hardened, infusible and insoluble state, allowing the resin to reach the hardened, infusible and insoluble state, reducing the so-treated walnut shells to a suitable size, and then, as before, coating them, forming a suspension, and injecting the suspension into the well bore.

2. Process according to claim 1 wherein the resin used for impregnating the walnut shell particles is the same as the liquid resinous adhesive material used for coating the walnut shells.

3. Process according to claim 2 wherein the resin used for impregnating the walnut shell particles and the liquid adhesive material for coating the impregnated particles is an epoxy resin curable with an amine.

4. Process according to claim 2 wherein the epoxy resin used for impregnating of the walnut shell particles and for coating the impregnated particles is a mixture of epoxy resin and polycarboxylic anhydride, the epoxy resin having at least three epoxy groups in primary position.

References Cited

UNITED STATES PATENTS

| | | | |
|---|---|---|---|
| 2,823,753 | 2/1958 | Henderson | 166—20 |
| 2,941,594 | 6/1960 | Ladd et al. | |
| 3,176,768 | 4/1965 | Brandt et al. | 166—33 |
| 3,254,717 | 6/1966 | Huitt et al. | 166—42 |

CHARLES E. O'CONNELL, *Primary Examiner.*

STEPHEN J. NOVOSAD, *Examiner.*